United States Patent
Zafarana et al.

(10) Patent No.: US 7,221,135 B2
(45) Date of Patent: May 22, 2007

(54) METHOD FOR REGULATING THE TIME CONSTANT MATCHING IN DC/DC CONVERTERS

(75) Inventors: Alessandro Zafarana, Milan (IT); Dario Zambotti, Vimodrone (IT); Stefano Saggini, San Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 210 days.

(21) Appl. No.: 11/111,489

(22) Filed: Apr. 20, 2005

(65) Prior Publication Data

US 2006/0238176 A1   Oct. 26, 2006

(51) Int. Cl.
*G05F 1/10* (2006.01)
*G05F 1/40* (2006.01)
(52) U.S. Cl. ............... 323/288; 323/274; 323/284; 323/290; 323/241
(58) Field of Classification Search ............... 323/209, 323/222, 237, 241, 242, 272, 274, 277, 282, 323/283, 284, 286, 288, 290
See application file for complete search history.

(56) References Cited

U.S. PATENT DOCUMENTS

| | | | | |
|---|---|---|---|---|
| 5,384,530 A | * | 1/1995 | Pflueger | 323/313 |
| 6,424,129 B1 | * | 7/2002 | Lethellier | 323/272 |
| 2005/0231181 A1 | * | 10/2005 | Bernacchia et al. | 323/274 |
| 2006/0043947 A1 | * | 3/2006 | Clavette et al. | 323/282 |

* cited by examiner

*Primary Examiner*—Jessica Han
(74) *Attorney, Agent, or Firm*—Lisa K. Jorgenson; Robert Iannucci; Seed IP Law Group PLLC

(57) ABSTRACT

A method regulates the time constant matching of a DC/DC converter phase, further to a variation of a load applied to an output of said phase. Such phase being associated with a coil network, with a series RL circuit and a reading network 10, with a series RC circuit connected in parallel to the coil network. The method includes an acquisition step, suitable to acquire the trend of a voltage detected across the capacitance $C_D$ of the reading network 10, transforming it into a current trend, a detection step suitable to identify a variation above a certain threshold value of said current trend, an identification step, enabled by said detection step, suitable to determine a slope of said current trend and a regulation step suitable to adapt the value of said resistance $R_D$ based on said slope determined by said identification step.

36 Claims, 10 Drawing Sheets

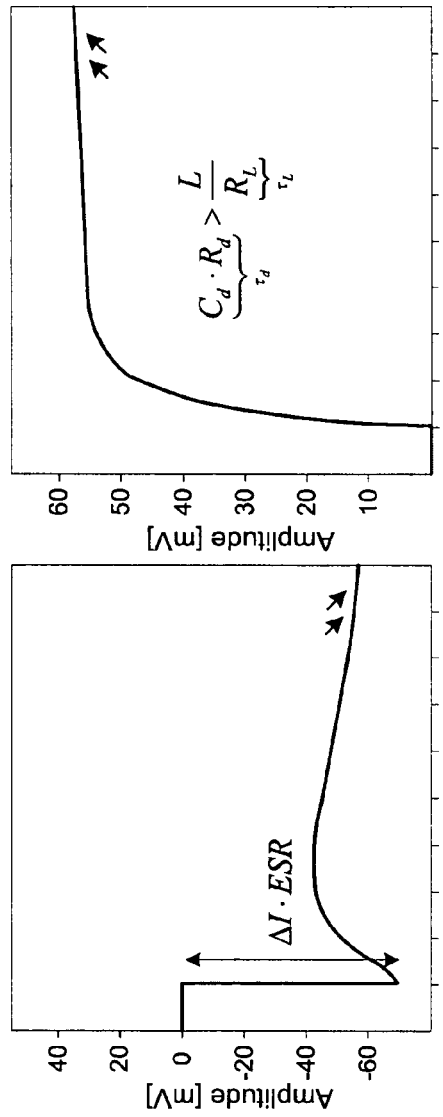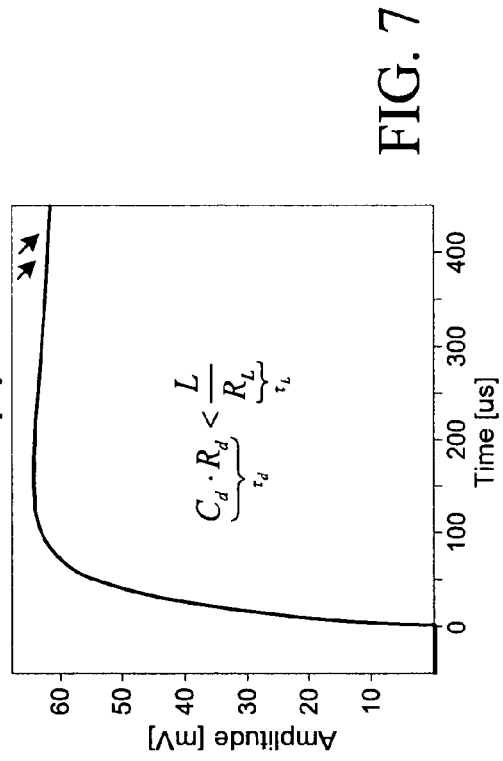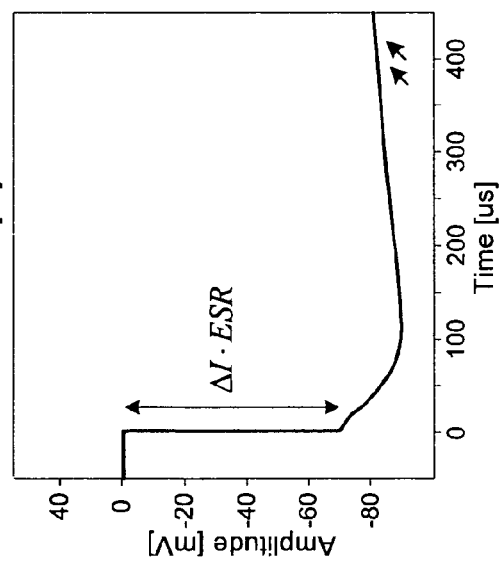
FIG. 4  FIG. 5  FIG. 6  FIG. 7

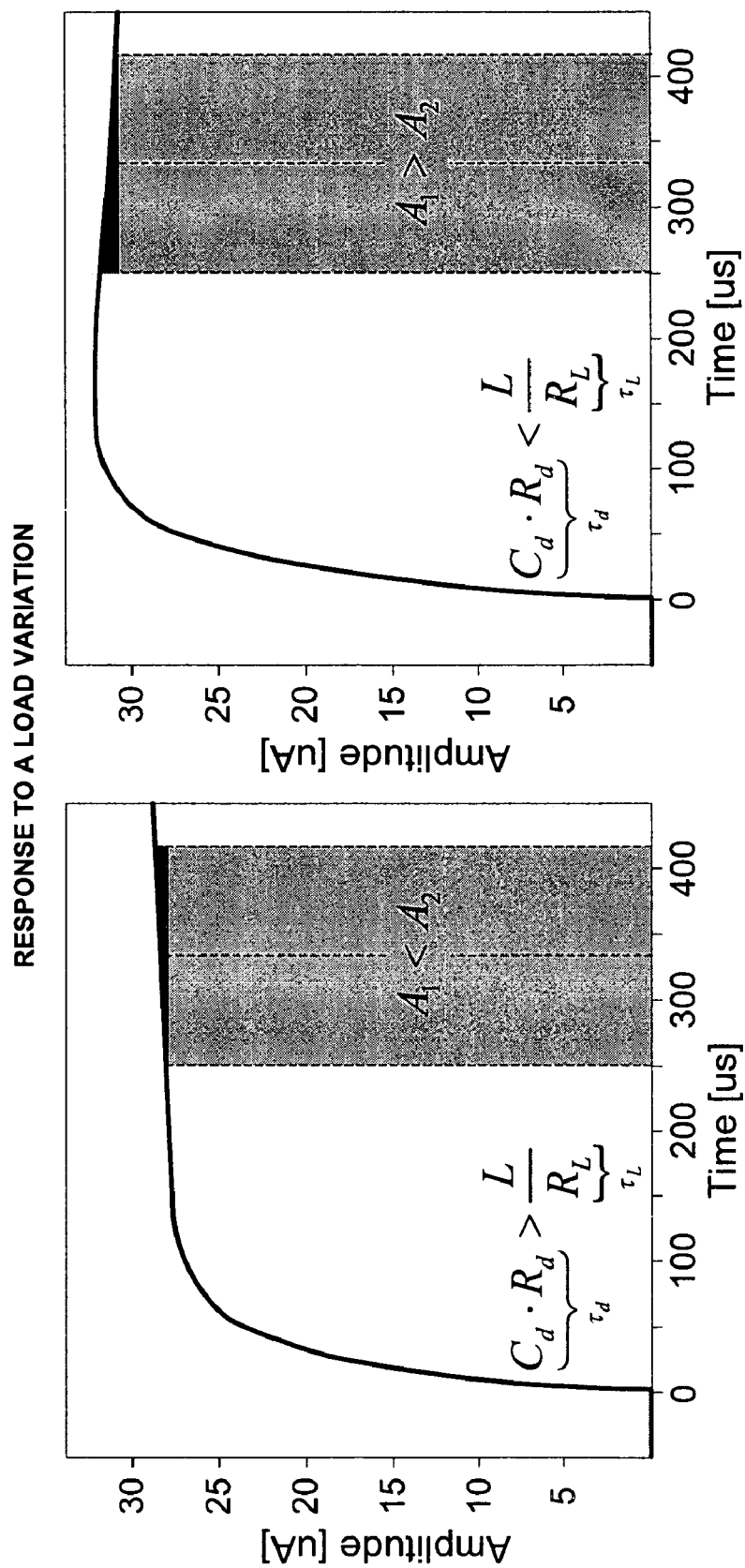

METHOD FOR REGULATING THE TIME CONSTANT MATCHING IN DC/DC CONVERTERS

BACKGROUND OF THE INVENTION

1. Field of the Invention

The present invention relates to a method for regulating the time constant matching, for example, in DC/DC converters.

The invention particularly, but not exclusively, relates to a method to be used in DC/DC converters, for example in voltage regulator module (VRM) applications, and the following description is made with reference to this field of application for convenience of illustration only.

The invention further relates to a corresponding regulation device for regulating and controlling the time constant matching in DC/DC converters.

2. Description of the Related Art

As it is well known, the evolution of the electric characteristics of processors for PCs, WORKSTATIONS and SERVERS obliges manufacturers to search for new solutions meeting the CPU requirements that include: high precision in the supply voltage, for instance +/−0.8% under steady state conditions and +/−3% under transient conditions.

In order to ensure an accurate supply, which respects more and more restrictive specifications, it is desirable to precisely know the value of the current flowing in the coils of the DC/DC converter used as power supply unit.

In order to ensure such a precision degree, designers are induced to use a current estimate method exploiting the parasitic resistance of each coil of the DC/DC converter.

The use of this method however introduces a drawback due to the real value offset of the components employed by the respective nominal value, jeopardizing the reading precision and thus the current estimate.

By analyzing the DC/DC converter it is observed that the parasitic resistance of each coil is not directly accessible and this so as to be able to draw the current information it is necessary to use an added electric network or reading network, placed in parallel to the coil and formed by a resistance $R_D$ and by a capacitance $C_D$, as for example shown in FIG. 1.

By now analyzing the transfer function, reported in the formula (1.1), between the voltage $V_{sense}$ developing across the capacitance $C_D$ and the current $I_L$ flowing in the coil, the presence of a term can be noted which depends on the frequency and which is also called doublet.

A variation of the doublet can alter the read current information. More precisely, an overestimate of the current which flows in the coil is performed, if the time constant of the reading network, $C_D R_D$ is lower than the time constant $L/R_L$ also called coil network. Whereas, in the opposite case there is a under-estimation of the read current.

$$V_{sense}(s) = I_L(s) \cdot R_L \cdot \frac{1 + s\frac{L}{R_L}}{\underbrace{1 + sC_D \cdot R_D}_{doublet}} \quad (1.1)$$

In order to have a correct current estimate it is thus necessary that the time constants of the reading network and coil network are equal, such correlation is also called "time constant matching." This condition does not normally occur due to the variation from the nominal value of the values of the components used as above hinted at, which negatively influences the time constant matching.

Let's remember that the components can depart from their nominal value due to a statistic variability, from a dependence on the temperature or simply from an ageing thereof.

Through tests carried out by the Applicant it has been observed how the use of standard components leads to differences between the two time constants which can also reach ±30%.

Thus, against a variation of the current required by the load, such difference can cause, on the DC/DC converter regulated output voltage, overelongations or subelongations which can jeopardize the tolerance band imposed by the specifications.

The effect of the overelongations and of the subelongations on the output voltage with respect to a constant ideal value is shown in FIG. 2 and it is due to a wrong Time Constant Matching.

As far as it is known, no specific solutions exist in the literature for correcting a wrong time constant matching.

A possible solution for trying to solve and/or to limit the entity of the overelongations and subelongations effects, is the use of particularly precise components, both in the coil network and in the reading network, and an oversized output capacitance.

Such solution however implies extremely high component costs linked to the precision required and, moreover, the use of such components also implies high costs in terms of area occupied on the motherboard.

Let's now analytically analyze an equation for the calculation of the tolerance band (TOB) i.e. of a DC/DC converter tolerance band with reference to the output voltage.

$$TOB_{manuf} = \sqrt{\underbrace{\left(\frac{VID \cdot k_{VID}}{reference}\right)^2 + V_{AVP}^2 \cdot \left(\underbrace{k_{gm}^2}_{\substack{Current \\ Sense}} + \underbrace{\frac{k_{ESR}^2}{n_{ph}}}_{\substack{sense \\ element}}\right)}_{STATIC} + \underbrace{V_{AVPdyn}^2 \cdot \left(\frac{k_L^2 + k_C^2}{n_{ph}}\right)}_{\substack{Time Constant \\ Matching \\ DYNAMIC}}} \quad (1.2)$$

$$\pm TOB = TOB_{manuf} + V_{ripple} + V_{TC} \quad (1.3)$$

In particular, the equation (1.3) defines the calculation for the determination of the tolerance band, which however needs the value of the $TOB_{manuf}$ defined by the equation (1.2).

As it can be observed, the equation (1.2) shows the dependence of the tolerance band on some characteristic parameters dependant on the typology of the used reading or sensing network. By introducing such parameters it is possible to understand which weight the single blocks, which compose a DC/DC converter, have in the global calculation of the TOB.

The equation (1.2) collects the static and dynamic variations relative to the DC/DC converter and, for obtaining the total contribution, they are quadratically summed.

The contribution of the time constant matching in the equation (1.2) is given by the third addend, wherein the terms $K_L$ and $K_C$ appear which are respectively the coil statistic variation and the capacitance $C_D$ one. Whereas, the term $n_{ph}$ indicates the number of the phases of each DC/DC converter and the term $V_{AVPdyn}$ indicates the variation of the output voltage against a variation of the required current $I_{dyn}$.

The terms $V_{ripple}$ and $V_{TC}$, reported in the equation (1.3), indicate the deterministic variations of the output voltage.

Let's now analyze the equation (1.4) which allows to highlight a residual difference between the two time constants equal to 4%.

$$4\% = \sqrt{\frac{K_L^2 + K_C^2}{n_{ph}}} \Rightarrow n_{ph} = 7, 8 \quad (1.4)$$

where: $K_L = 10\%$ and $K_C = 5\%$

As it can be observed, with current and known DC/DC converters a residual difference between the two time constants equal to 4% can be reached by using an eight-phase system so as to allow a greater mediation of the unbalance of each phase.

However, systems with such a high number of phases are out of the normal trend for DC/DC converters, which require reduced costs and minimal uses of areas in the motherboard.

Moreover, it is good to consider that the above indicated result of the equation (1.4) solution has been obtained by using particularly precise components and, in a particular way, as regards the output capacitance, a capacitor with COG dielectric has been used, which has a great precision, a lower dependence on the temperature and a lower aging effect with respect to the normal capacitors. However, such types of COG capacitors have a more than double cost with respect to the common capacitors.

BRIEF SUMMARY OF THE INVENTION

A first embodiment of the present invention provides a method for regulating the time constant matching in such a manner to equalize the time constant of the reading network with that of the coil network in a simple and quick way, with a lower dependence on the temperature and the aging of the components and which allows the use of common components and having such functional characteristics as to allow to overcome the limits still affecting the methods according to the prior art.

A further embodiment of the present invention is a controller device which allows to regulate the time constant matching of a DC/DC converter by employing low cost components and by occupying a reduced area on the motherboard which allows to make the device extremely compact and economic, overcoming the limits and the drawbacks of the solutions proposed by the known technique.

One embodiment of the present invention realizes a regulation method of the adaptive type on the time constant matching of each DC/DC converter phase allowing to analyze the phase response to a load variation by regulating in a corresponding way a resistance $R_D$, of the variable type, progressively reaching the optimal condition wherein the time constant of the reading network is equal to the time constant of the coil network.

One embodiment of the invention relates to a method for regulating the time constant matching of a DC/DC converter phase following a variation of a load applied to an output of the phase, the phase being associated with a coil network having an LR circuit connected in series and being connected to a reading network having an RC circuit connected in parallel to the coil network. The method includes:

an acquisition step that acquires a trend of a voltage $V_{sense}$ detected across a capacitance of said RC circuit and for transforming the voltage trend into a current trend $I_{sense}$;

a detection step that identifies a variation over a threshold value in the trend of the current $I_{sense}$ obtained from the acquisition step in response to a variation of the load;

an identification step, enabled by the detection step, for determining a slope of the current $I_{sense}$ trend;

a regulation step that adapts the resistance value of the RC circuit according to the value of the slope determined by the identification step.

A further embodiment of the invention relates to a device for regulating the time constant matching of a DC/DC converter phase following a variation of a load applied to an output of the phase, the phase being associated to a coil network having an LR circuit connected in series and being connected to a reading network having an RC circuit connected in parallel to the coil network. The device includes:

a reading circuit having a V/I switch suitable to switch the trend of a voltage $V_{sense}$ detected across the capacitance of the RC circuit to obtain a corresponding current $I_{sense}$ trend;

a load variation sensor structured to identify a variation over a threshold value in the trend of the current $I_{sense}$ obtained from the reading circuit in response to a variation of the load;

a mismatch sensor enabled by the variation sensor structured to determine a slope of the current $I_{sense}$ trend;

an up-down counter structured to regulate the resistance value of the RC circuit according to the slope determined by the mismatch sensor.

The features and advantages of the method and device according to the present invention will be apparent from the following detailed description given by way of non-limiting example with reference to the following drawings.

BRIEF DESCRIPTION OF THE SEVERAL VIEWS OF THE DRAWINGS

In such drawings:

FIGS. 4 and 5 are respectively a graphic representation of a load current variation and a respective time constant variation in a under-estimation, i.e. when the time constant of the reading circuit is greater than that of the coil circuit;

FIGS. 6 and 7 are respectively a graphic representation of a load current variation and a respective variation of the time constant in an over-estimation, i.e. when the time constant of the reading circuit is lower than that of the coil circuit;

FIGS. 8 and 9 are time/amplitude representations of the Isense current in response to a load variation, respectively an increase or a decrease;

DETAILED DESCRIPTION OF THE INVENTION

Figure 1:
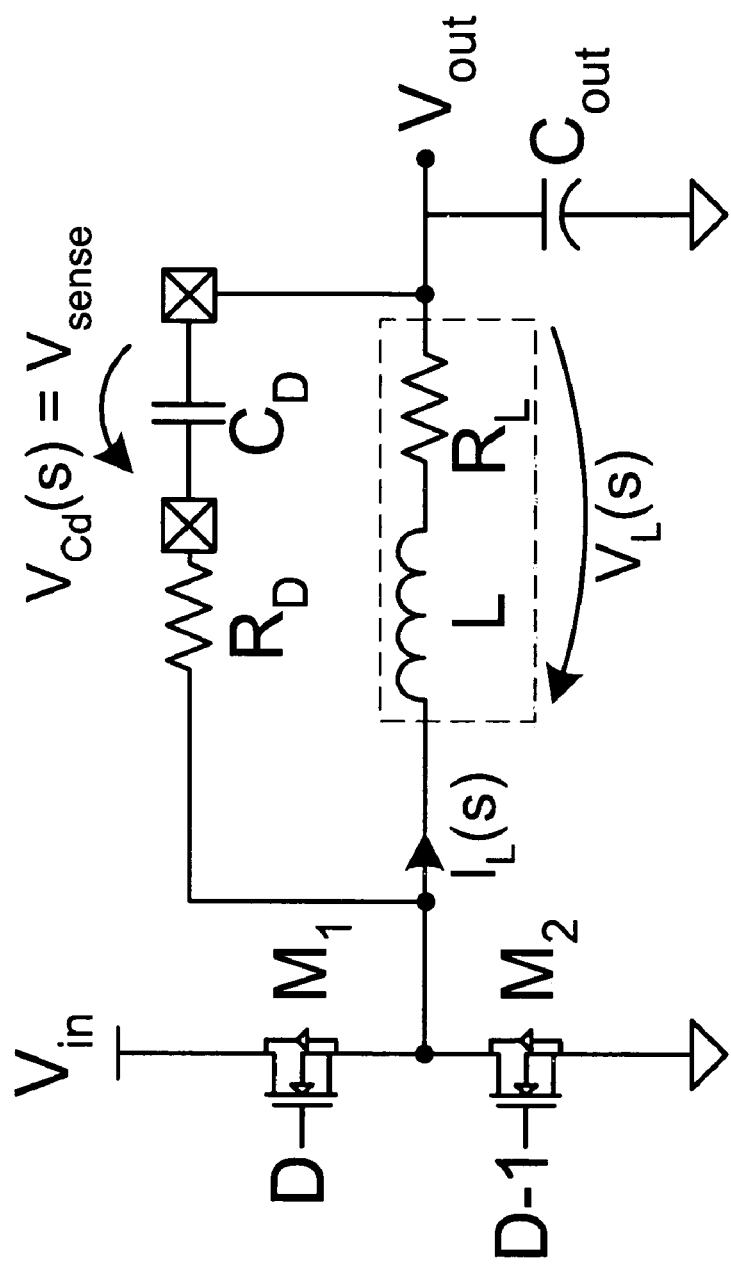
FIG. 1 shows a portion of a DC/DC converter represented according to the prior art.
Figure 2:
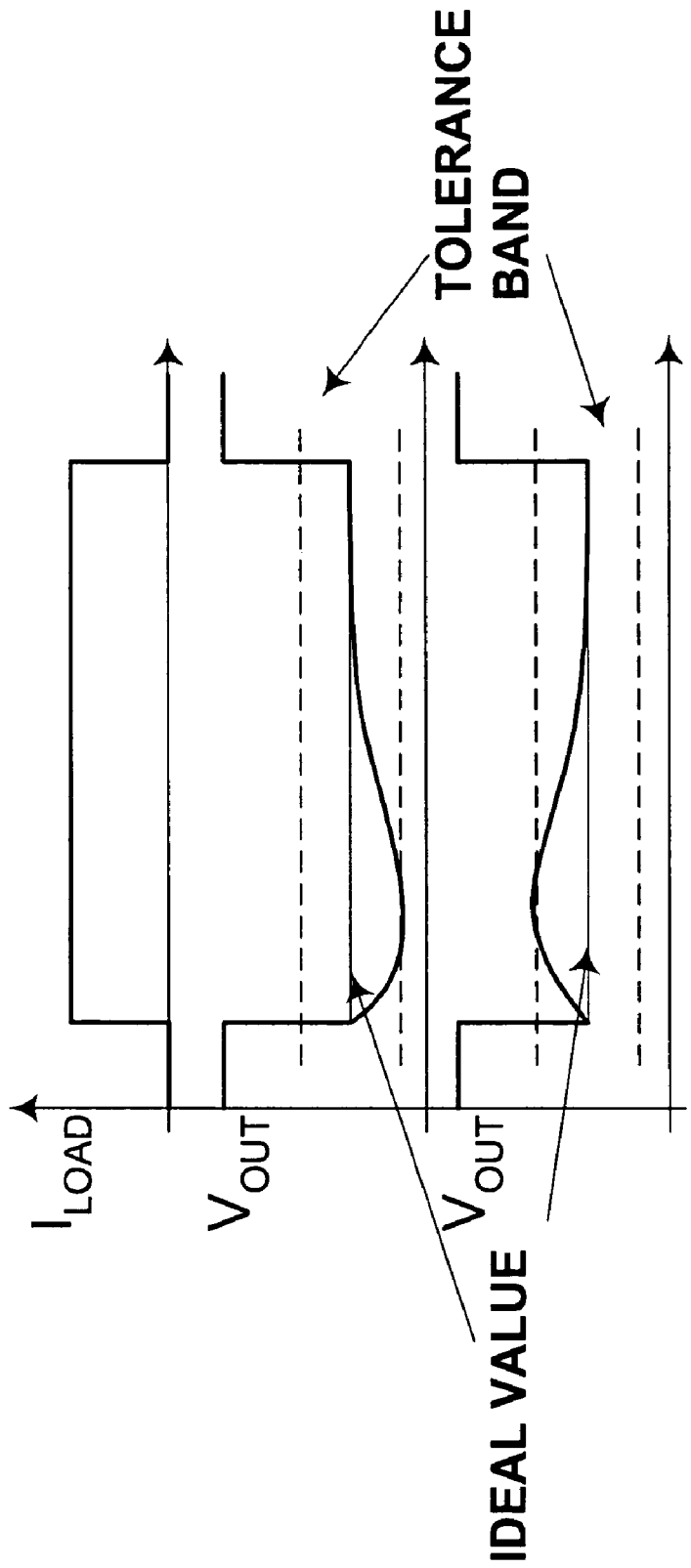
FIG. 2 graphically shows the output voltage of FIG. 1 with possible subelongations or overelongations
Figure 3:
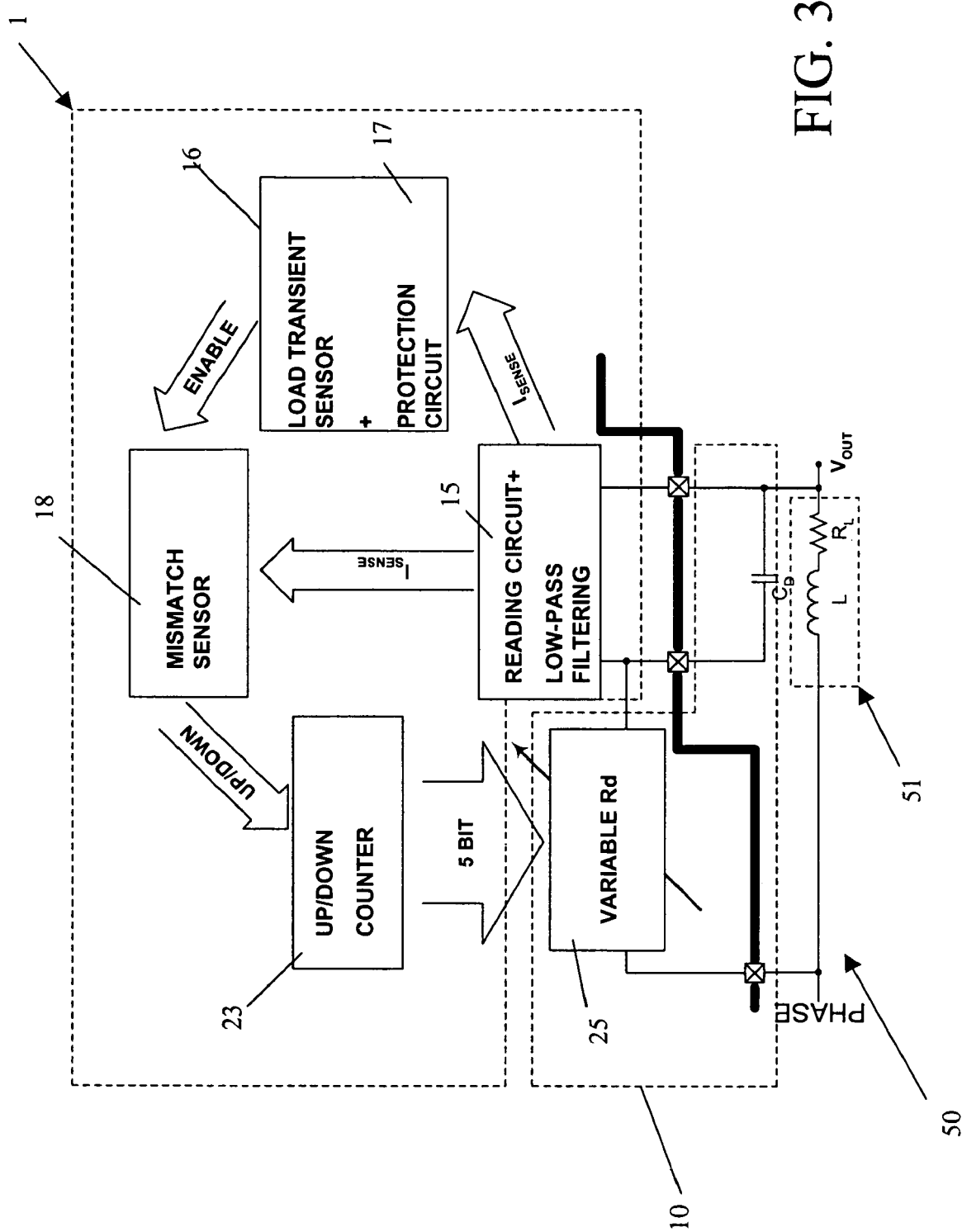
FIG. 3 is a block scheme of the method according to one embodiment of the present invention.

A regulation method, according to one embodiment of the present invention, is schematically shown by means of a block scheme reported in FIG. 3 and applied to a DC/DC converter phase 50.

The DC/DC converter phase 50 is associated, in a usual way, with a coil network 51 comprising a series LR circuit with an inductance L and a parasitic resistance $R_L$.

The DC/DC converter phase 50 also provides a reading network 10 comprising an RC circuit with a capacitance $C_D$ in series with a variable resistance $R_D$, placed in parallel to the coil network 51.

Advantageously, the capacitance $C_D$ and the resistance $R_D$ are controlled and regulated by a device which, in the block scheme, is indicated with number 1.

The device 1, allows to regulate, further to a variation of the load applied to the DC/DC converter, the time constant matching of the phase 50.

Advantageously, the regulation method according to one embodiment of the present invention is of the adaptive type, i.e. it allows to regulate a time constant $\tau_D$ of the reading network 10, of the phase 50, adapting it to a variation of the time constant $T_L$ of the coil network 51 due to the effective load variation, thus optimizing the time constant matching.

Obviously, the regulation method and the device 1 realization of the method should be applied to each DC/DC converter phase 50.

In order to define the situation wherein a DC/DC converter phase 50 is, the trend of its output voltage $V_{OUT}$ or, similarly, the trend of the voltage $V_{sense}$ detected across the capacitance $C_D$ of the reading network 10 can be observed.

Figure 15:
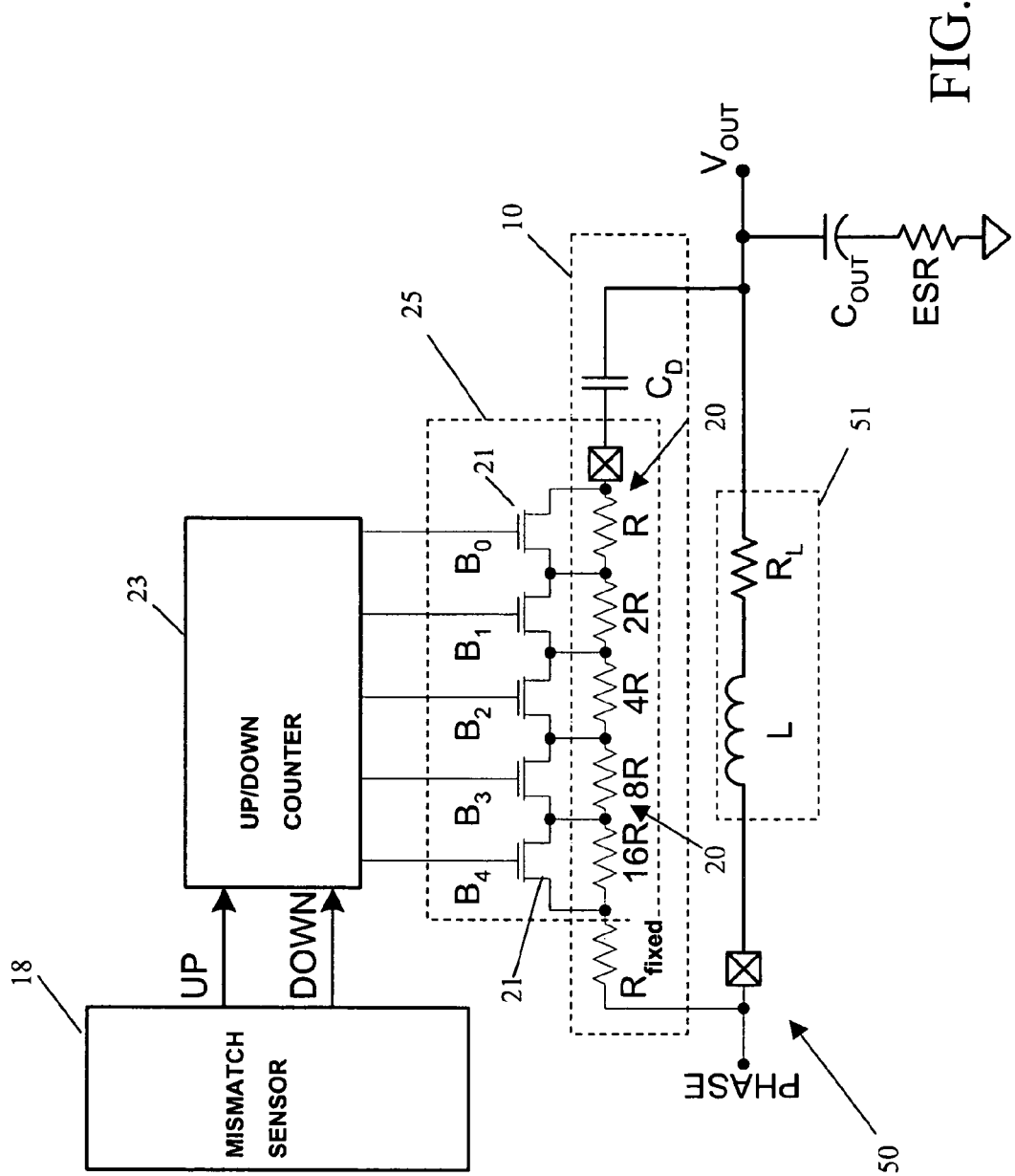
FIG. 15 shows a part of the device according to one embodiment of the present invention.

Generally, at the output of the DC/DC converter a capacitance is placed, called output capacitance $C_{OUT}$, as highlighted in FIG. 15, and interposed between the output voltage $V_{OUT}$ of the phase 50 and a ground reference voltage.

Against a variation of the load applied to the DC/DC converter, also called load transient, a distinctive element which allows to establish the time constant matching, is advantageously an analysis of the slope with which the trend of the output voltage $V_{OUT}$ or of the voltage $V_{sense}$ lies down on a new speed value due to the load variation.

Thus, for example, FIGS. 4 and 6 highlight possible trends of the output voltage $V_{OUT}$ whereas FIGS. 5 and 7 indicate the trends of the corresponding voltage $V_{sense}$.

The arrows reported in such figures indicate the curve slopes in a section wherein the response to the load variation is, by now, denominated by the time constant $L/R_L$ of the coil network 51.

Entering into details, it is observed that if the time constant $\tau_D = C_D \cdot R_D$ of the reading network 10 is greater than the time constant $\tau_L = L/R_L$ of the coil network 51, the real value of the current flowing in the inductance L is being under-estimated. This means that the DC/DC converter phase 50 supplies more current than that required by the load, such current thus allows to load the output capacitance $C_{OUT}$ determining an overelongation on the output voltage $V_{OUT}$ as indicated in FIG. 4 or similarly a positive slope in the voltage $V_{sense}$ as indicated in FIG. 5.

In the opposite case, wherein $\tau_D$ is lower than $T_L$, the correct value of the current flowing in the inductance L is overestimated. The inductance thus supplies a minor current with respect to that required by the load and this determines, against the output capacitance $C_{OUT}$, a subelongation of the output voltage $V_{OUT}$, as indicated in FIG. 6 or similarly a negative slope of the voltage $V_{sense}$, as indicated in FIG. 7.

This explains the need of providing, for each single DC/DC converter phase 50, a time constant matching.

Advantageously, therefore, the adaptive regulation method provides an acquisition step wherein a reading circuit 15 acquires information in voltage $V_{sense}$ which develops across the capacitance $C_D$ and it transforms it into a current $I_{sense}$ trend, as indicated in FIG. 3.

Obviously, the acquisition step can be realized in several ways for example by means of a switch V/I suitable to switch the trend of a voltage $V_{sense}$, detected across said capacitance $C_D$, in a current $I_{sense}$ trend.

Suitably, the adaptive method further provides an identification step wherein the slope is determined with which the current $I_{sense}$ varies, further to a load variation or load transient.

Advantageously, the identification step provides the determination of the slope on the basis of a current $I_{sense}$ integration.

The use of the integration operation allows to obtain an optimal immunity to noises. In fact, possible spikes or noises overlapped to the current $I_{sense}$ or useful signal undergo a dampening due exactly to the integration operation of the same.

In the case of the proposed solution, the integration operation and thus the identification of the current $I_{sense}$ trend slope uses the principle according to which, in a time/amplitude configuration, the slope can be determined by means of a difference of areas subtended by the current $I_{sense}$ trend in two equal and adjacent time sections T' and T".

Such areas, as highlighted in particular in FIGS. 8 and 9, are indicated with $A_1$ and $A_2$ and being the sampling times defined as $T_0$, $T_1$ and $T_2$, it follows that $T'=(T_1-T_0)$ and $T''=(T_2-T_1)$. The sign taken by such difference indicates the current $I_{sense}$ slope which is particularly positive if $A_1$ is lower than $A_2$, as indicated in FIG. 8, and negative in the opposite case, shown in FIG. 9. Whereas, in the case wherein the time constant matching is respected, the difference between areas $A_1$ and $A_2$ is equal to zero.

Figure 10:
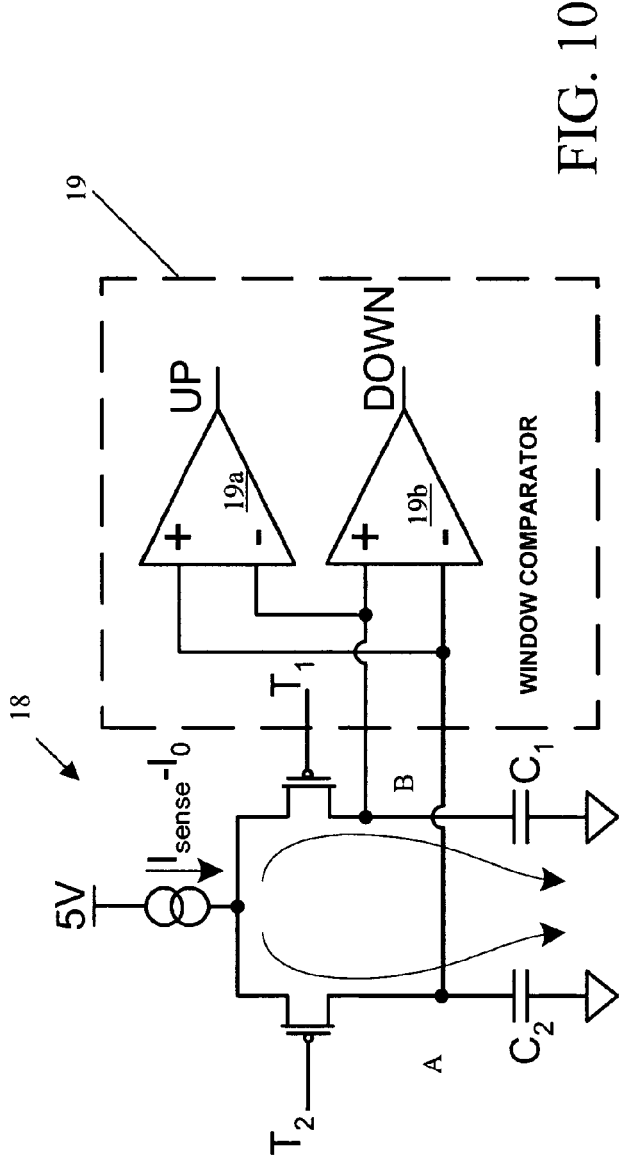
FIG. 10 is a representation of a part of the device realized in according to one embodiment of the present invention.

A possible realisation of the identification step can occur, as indicated in FIG. 3, by means of a mismatch sensor 18 obtained according to the embodiment indicated in FIG. 10.

The mismatch sensor 18 comprises two switches, such as for example two MOS transistors T1 and T2, respectively connected between the input and a ground voltage reference (GND) by means of the interposition of two capacitances $C_1$ and $C_2$ in correspondence with two nodes A and B.

The mismatch sensor 18 also comprises a window comparator 19 which has two inputs connected to the nodes A and B, to detect the voltages developing across the capacitances $C_1$ and $C_2$ loaded by means of the switches T1 and T2 with the current or a current $I_{sense}$ or a difference current ($I_{sense}-I_0$) where $I_0$ is a constant current value as it will be better specified hereafter.

The window comparator 19 can be for example realized by means of a pair of comparators 19A and 19B both of them being input, in an inverted way the voltages present at the nodes A and B and they have an output respectively UP and DOWN.

Obviously, the voltages developing across the capacities $C_1$ and $C_2$ are proportional to the areas A1 and A2, thus, the determination of their difference defines the current $I_{sense}$ slope, positive or negative.

In particular, the outputs UP and DOWN of the pair of comparators 19A and 19B will activate themselves in an alternated way according to the slope being positive or negative.

Advantageously, during such identification step it is suitable to perform a minimization step by removing from the current $I_{sense}$ a denominated constant component $I_0$, i.e. the current sampled at the time $T_0$. By removing, for each instant comprised between $T_0$ and $T_2$, the constant component $I_0$, as far as the area is concerned it is as if the light grey part indicated in the FIGS. 8 and 9 were eliminated.

The difference current ($I_{sense}-I_0$) still has all the information and the characteristics of the current $I_{sense}$ it reduces the value of the current at the input of the mismatch sensor 18 and, moreover, the possible dynamic problems during the device designing step are reduced.

Figure 11:
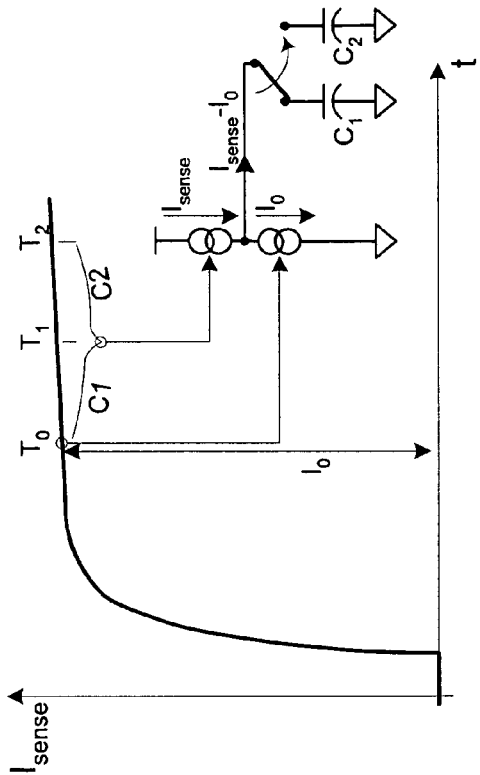
FIG. 11 is a schematic representation of a method step realized according to one embodiment of the present invention.

The current $I_{sense}$ minimisation step can be realised in several ways, for example as highlighted in FIG. 11, a sampling of the current value $I_{sense}$ can be provided an instant before the start of the integration operation, defining a constant component $I_0$, a copy thereof is made and it is taken away from instantaneous value of the current $I_{sense}$ the moment when the capacitances $C_1$ and $C_2$ are loaded.

Figure 12:
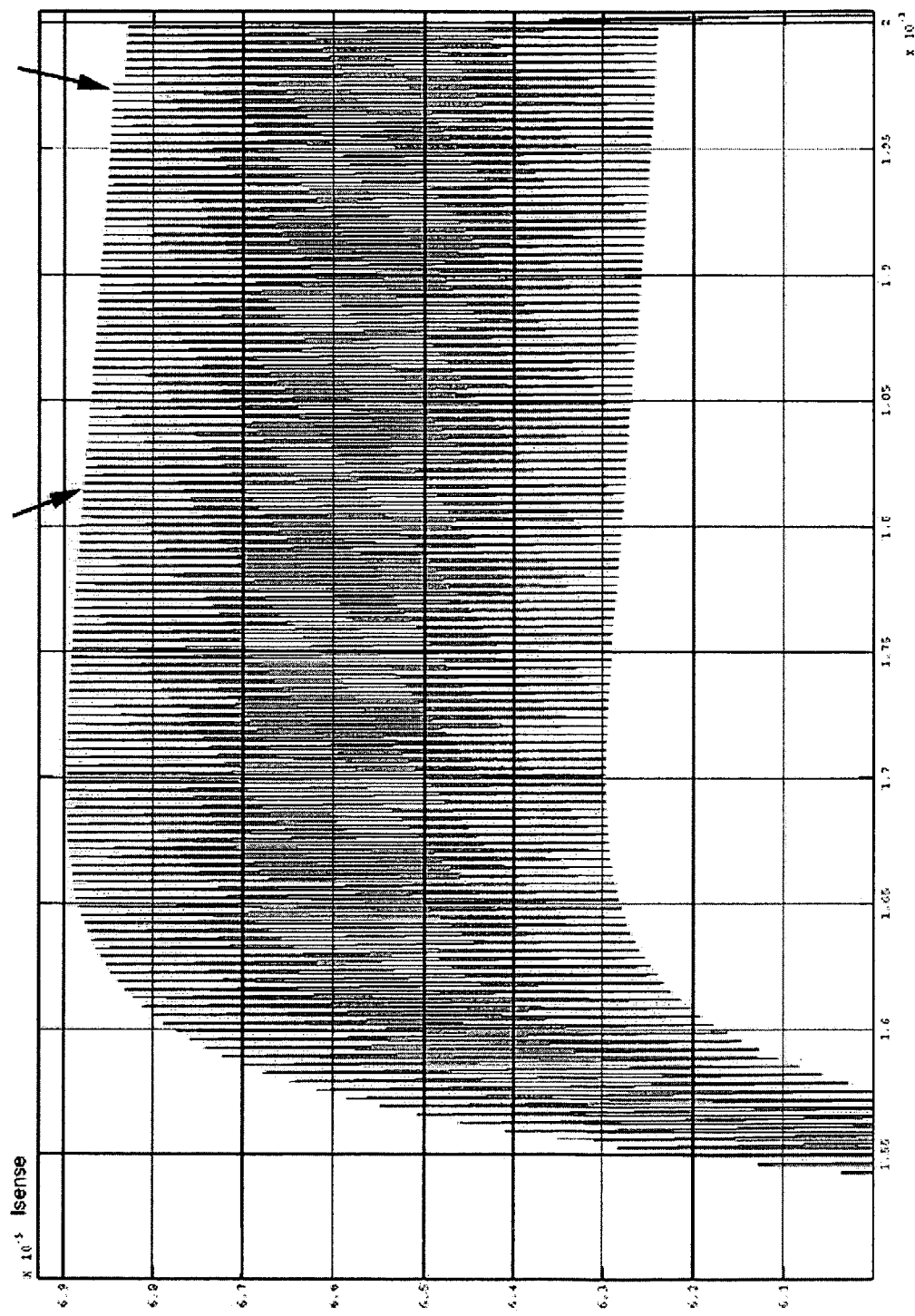
FIG. 12 shows a trend of the Isense current.

As it can be analyzed from FIG. 12, the amplitude order of the current $I_{sense}$ slope, originated by a wrong time constant matching is highlighted by the difference between the ordinates of two points indicated with the arrows and it is lower than 1 µA.

Such slope value, as it is known, is much lower than the value of a possible ripple in the current $I_{sense}$.

Thus, if the integration operation is performed with a current $I_{sense}$ signal comprising a possible ripple, besides a quick device saturation, the effective information would be masked.

Advantageously, the method provides, further to the detection step a filtering step of the current $I_{sense}$ to reduce the possible ripple contribution.

It is good to note how the time constants which govern the time constant matching are in the order of some hundreds of hertz while the ripple typically has a frequency of some hundreds of kilohertz kilogram.

Advantageously, the filtering step will thus have to occur at low frequency by using a low-pass filter which, from the current $I_{sense}$, allows to eliminate a good part of the ripple. Such low-pass filter can be for example placed in the reading circuit 15 indicated in FIG. 3.

Figure 13:
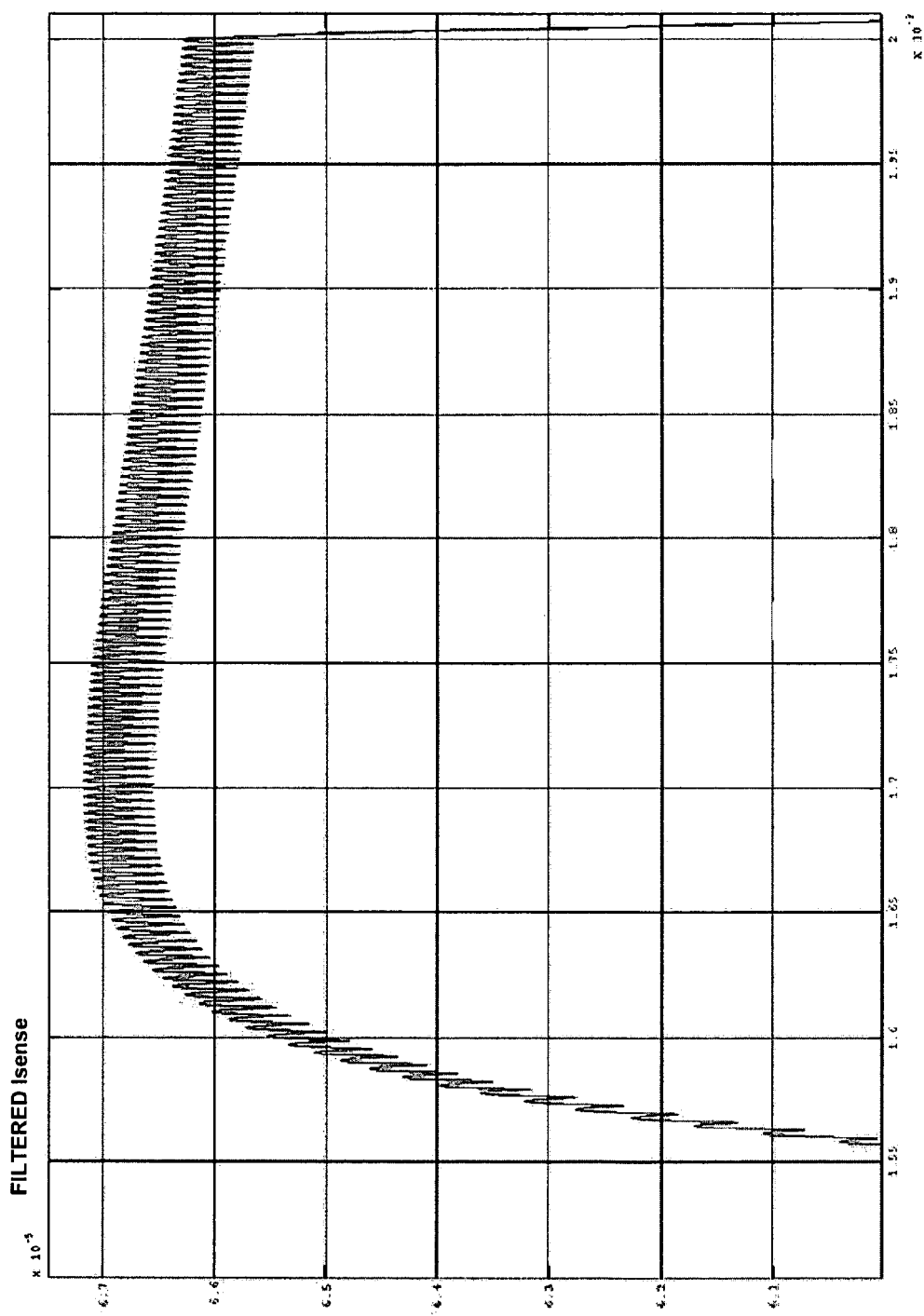
FIG. 13 shows the Isense current of FIG. 12 filtered by means of a low-pass filter.

The effect of the filtering step on the signal $I_{sense}$ before ripple does not change the global current trend as highlighted in FIG. 13 and this allows to reach the sensitivity degree required by the method still maintaining all the information of the time constant matching.

For acquiring the information of the time constant matching after a load variation or load transient it is necessary to determine, in each DC/DC converter phase 50, a latency T.

In fact, being the information relative to the Time Constant Matching linked to the final part of the time constant of the coil network 51 $\tau_L=L/R_L$, which, on the other hand, is the greatest time constant between those of the closed-loop system, it is necessary to wait until all the other time constants fade away.

The latency T is generally equal to a fraction equal to ⅘ of the greatest time constant after the value of $\tau_L$, of the closed-loop system. In the shown example, the latency T is fixed at 300 µs.

Advantageously, the latency T allows to time all the various method steps.

A necessary condition to perform a correct measure of the current $I_{sense}$ trend slope is that no further load variations have to occur during a whole duration D of the detection step.

Such duration D is generally determined by the sensor structure and it is comprised between $0<D<4*\tau_L$.

In the described embodiment the duration D is fixed at (66+66)µs, thus the latency T more the duration D is equal to (300+122)=422 µs.

Figure 14:
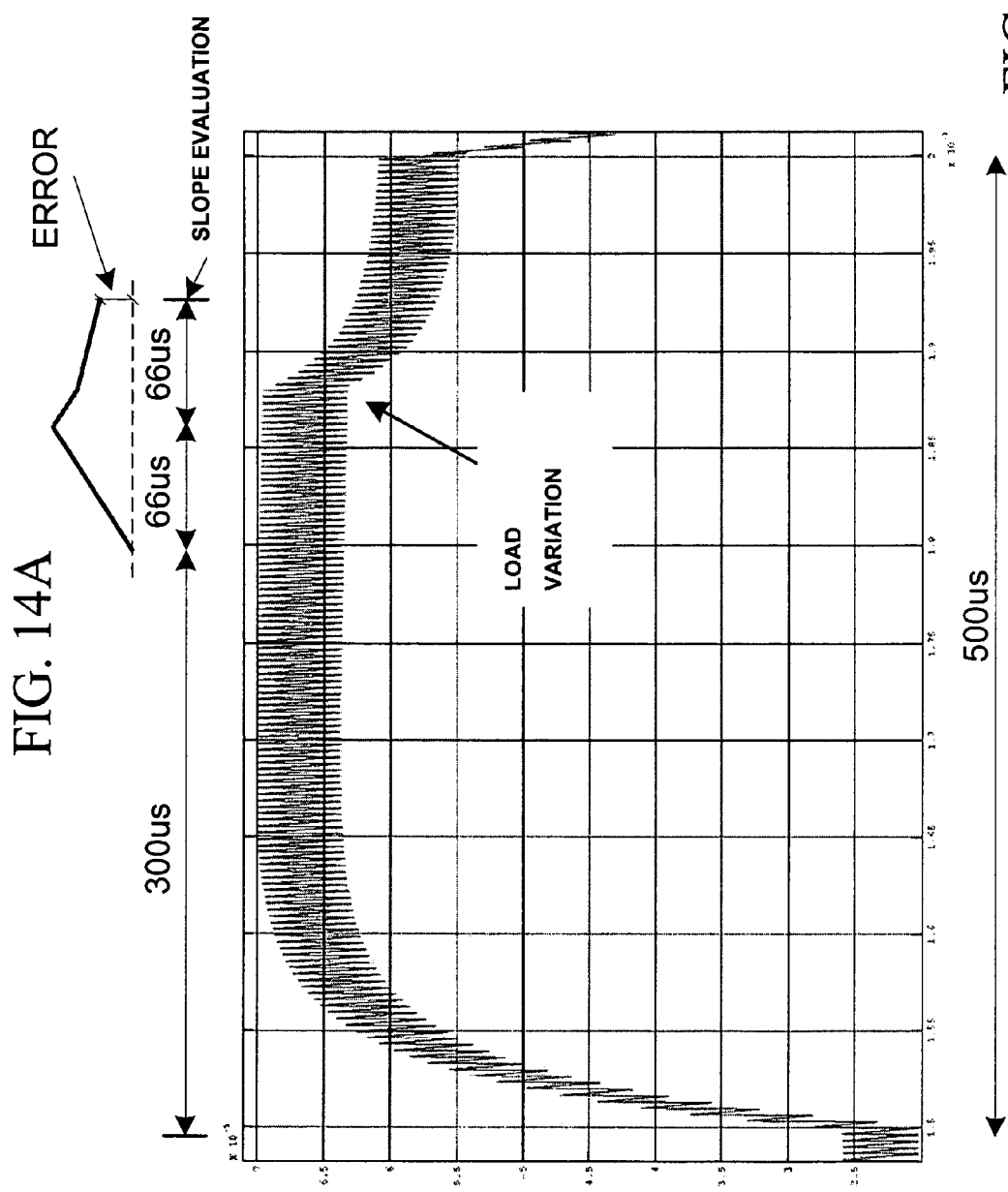
FIG. 14 shows the Isense current trend before a further load variation.

An example of the $I_{sense}$ current offset trend further to a load variation is shown in FIG. 14, where one can observe how the load variation leads to a wrong interpretation of the trend as indicated in the corresponding graph of FIG. 14a and thus of a wrong time constant matching evaluation.

The detection step can be realized in several ways for example by means of a load variation sensor 16 and a protection circuit 17.

The role played by the load variation sensor 16 is of fundamental importance in order not to make errors in the evaluation of the Time Constant Matching condition. For this reason the architecture chosen for the sensor 16 is based, once more, on the integration method.

The sensor 16 is connected to the reading circuit 15 and it receives therefrom the current $I_{sense}$ or a difference current ($I_{sense}-I_0$) by means of the interposition of the protection circuit 17 which comprises one or more comparators, not highlighted in the figures and of a known type, which allow, during the detection step, to highlight the presence of a further variation of the load itself.

The sensor 16 must be able to discriminate the different load variations, which occur during the detection step, in relation to the status wherein the recognition step occurs.

In fact, the load variations can generate a more or less marked error of the time constant matching according to the load variation amplitude.

This means that the subelongation or overelongation on the voltage output $V_{OUT}$ of a DC/DC converter phase 50 is less evident during small load variations.

In this regard, the sensor 16 is calibrated for being able to detect load variations above a certain threshold value $S_r$, which is set directly during the design step and it depends on the resolution of the acquisition system, more in general it can be comprised between $I_{MAX}/2$ and $I_{MAX}$, where $I_{MAX}$ indicates the maximum current the converter DC/DC can supply. In the shown example, the threshold value $S_r$ has been set at 40 A.

Once the detection step has been started, the protection circuit 17 comparators are enabled. Such comparators have in turn a threshold $S_r$, which is however lower with respect to the threshold value $S_r$ of the sensor 16, thus allowing the recognition of much smaller load variations.

The number of comparators used in the protection circuit 17 influences the precision degree required by the device 1 and obviously each threshold $S_r$ of each comparator.

The comparison step, by means of the sensor 16 and of the protection circuit 17, enables the identification step and thus the mismatch sensor 18, but it allows also to interrupt such comparison step by disabling the identification step before a load variation which would damage the slope detection of current $I_{sense}$ or of a difference current.

Obviously, the identification step of the method generates, according to the detected slope, an output UP or DOWN.

Advantageously, the method provides a regulation step suitable to be input the output of the identification step regulating, in a corresponding way, the variable resistance $R_D$ of the reading network 10.

The regulation step can be realized in several ways, for example as highlighted in FIG. 15, by means of an up-down counter 23 which, supplied by the output UP or DOWN of the mismatch sensor 18, allows to regulate the resistance $R_D$ according to the current $I_{sense}$ slope detected by the mismatch sensor 18.

The resistance $R_D$ is of the variable type, which can be obtained in several ways. A possible embodiment provides the use of a structure 25 made of a series of N resistances 20, wherein the values range from R to $R^N$, and N suitable switches 21 placed in parallel to each one of the N resistances 20.

In such way, the counter up-down 23 on the basis of the signal received from the mismatch sensor 18 opens or closes the N switches 21 suitably regulating, increasing or decreasing the value of the resistance $R_D$ in series to the capacitance $C_D$, so as to obtain a correct time constant matching value.

The number of the N resistances 20 used in the structure 25 determines the precision degree with which the time constant $\tau_D$ of the reading network 10 can be regulated.

In the case shown in FIG. 15, by way of example, the counter UP-DOWN is of the 5 bit type and thus the switches 21 are five.

Obviously the present invention can undergo several modifications all within the same scope of protection.

In particular, a recognition step and/or a detection step can be provided, realized by means of a digital approach whereas the regulation step could be performed by means of a continuous solution, without however invalidating the goodness of the regulation method as described.

A main advantage of the regulation method is that of allowing a simple regulation of the resistance $R_D$ of the reading network 10 by adapting it to the detected slope of the current $I_{sense}$ trend or of a difference current $(I_{sense}-I_0)$ proportional thereto allowing to reach an exact at the time constant matching in a quick way.

A remarkable further advantage of the method is that of estimating the real current value flowing in the inductance L of the coil network 51 and of supplying the exact current required by the load variation thus avoiding the formation of overelongations or subelongations in the output voltage.

Another advantage of the present method is given by the integration operations required during the acquisition step and during the identification step, which allow to make the method particularly exempt form the presence of possible noises in the current $I_{sense}$ or in a current proportional thereto.

Another advantage is that the proposed method allows to use, for the realization of the various steps it is made of, non particularly precise common components, thus making the method little expensive and suitable to be applied on a large scale to each DC/DC converter.

A further advantage is represented by the fact that the proposed method can be realized with a minimal employment of occupied area in the motherboard with a remarkable saving on the global cost.

Further, the proposed method allows to realize DC/DC converters which have such specifications as to remain within the currently required restrictive characteristics.

A further advantage of the proposed method lies in that, through tests carried out by the Applicant, it has been observed how the 4% parameter required for the above reported equation (1.4) resolution can be normally obtained without the demand for particular and expensive components.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for regulating time constant matching of a DC/DC converter phase following a variation of a load applied to an output of said phase, said phase being associated with a coil network having an LR circuit connected in series and being connected to a reading network having an RC circuit connected in parallel to said coil network, the method comprising:
   an acquisition step that acquires a trend of a voltage detected across a capacitance of said RC circuit and transforms the voltage trend into a current trend;
   a detection step that identifies a variation over a threshold value in the current trend obtained from said acquisition step;
   an identification step, enabled by said detection step, that determines a slope of said current trend; and
   a regulation step that adapts a resistance value of said RC circuit according to said slope determined by said identification step.

2. A method according to claim 1, wherein said identification step determines said slope based on an integration operation of said current trend.

3. A method according to claim 2, wherein said identification step determines said slope by determining a difference of areas implied by said current trend, in a time/amplitude configuration, made in two equal and adjacent time sections T' and T", said identification step allowing activation of a first output signal in case said slope is determined positive with a first area being lower than a second area and of a second output in case said slope is determined negative with the first area being higher than the second area.

4. A method according to claim 2, wherein said identification step comprises a minimization step that eliminates from said current trend a constant component to obtain a difference current, said identification step determining said slope based on an integration operation of said difference current.

5. A method according to claim 4, wherein said minimization step provides a sampling of a value of said current trend one instant before a start of said integration operation, in order to define said constant component to be removed from said current trend.

6. A method according to claim 1, wherein said acquisition step provides a filtering of said-current trend.

7. A method according to claim 6, wherein said filtering step is provided by a low-pass filter.

8. A method according to claim 1, wherein said detection step is activated further to a variation of the load applied to said output of said phase after a latency time that is generally equal to a fraction of ⅘ of a highest value of a time constant of the coil network.

9. A method according to claim 8, wherein said latency time of said detection step is preferably equal to 300 μs.

10. A method according to claim 1, wherein said detection step is based on an integration method.

11. A method according to claim 1, wherein said detection step has a duration comprised between 0 and $4*\tau_L$ where $\tau_L = L/R_L$ and where L is an inductance of the LR circuit and $R_L$ is a resistance of the LR circuit.

12. A method according to claim 11, wherein said detection step during said duration allows to enable or disable said identification step based on overcoming a threshold value.

13. A method according to claim 12, wherein said threshold value is a value comprised between $I_{MAX}/2$ and $I_{MAX}$, where $I_{MAX}$ indicates a highest current that the DC/DC converter phase can supply.

14. A method according to claim 13, wherein said threshold value is equal to 40 A.

15. A device for regulating time constant matching of a DC/DC converter phase following a variation of a load applied to an output of said phase, said phase being associated with a coil network having an LR circuit connected in series and being connected to a reading network having an RC circuit connected in parallel to said coil network, the device comprising:
   a reading circuit having a V/I switch suitable to switch a trend of a voltage detected across a capacitance of said RC circuit to obtain a corresponding current trend;
   a load variation sensor structured to identify a variation over a threshold value in the current trend obtained from said reading circuit;
   a mismatch sensor enabled by said variation sensor and structured to determine a slope of said current trend; and
   an up-down counter structured to regulate a resistance of said RC circuit according to said slope determined by said mismatch sensor.

16. A device according to claim 15, wherein said mismatch sensor determines said slope on the basis of an integration operation of said current trend.

17. A device according to claim 16, wherein said mismatch sensor comprises first and second legs, connected between first and second voltage references, and a window comparator, the first leg including a first switch connected to a first capacitance by a first node, the second leg including a second switch connected to a second capacitance by a second node, and the window comparator including first and second inputs connected respectively to said first and second nodes and first and second outputs activated in an alternated way based on voltages present at said first and second nodes.

18. A device according to claim 17, wherein said window comparator of said mismatch sensor comprises a pair of comparators both being input, in an inverted way, said voltages at said first and second nodes and having said first and second outputs, respectively.

19. A device according to claim 17, wherein said mismatch sensor samples said current trend an instant before starting to load said first and second capacitances defining a constant component and loading said first and second capacitances with a difference current.

20. Device according to claim 17, wherein said first and second switches are MOS transistors.

21. A device according to claim 17, wherein said up-down counter regulates with an output said resistance in relation to said first and second outputs of said mismatch sensor which define said slope of said current trend.

22. A device according to claim 21, wherein said resistance of said circuit RC is variable and comprises a structure having a series of N resistances and N suitable switches in parallel with said N resistances, respectively.

23. A device according to claim 22, wherein said series of N resistances have values comprised respectively between R and $R^N$.

24. A device according to claim 22, wherein said up-down counter, in response to a signal received from said mismatch sensor, opens or closes said N switches regulating, increasing or decreasing in a corresponding way, said variable resistance value.

25. A device according to claim 22, wherein the number of said N resistances used in said structure determines a precision degree with which a time constant $\tau_D$ of said reading network can be regulated.

26. A device according to claim 15, wherein said mismatch sensor determines said slope based on an integration operation of a current proportional to said current trend.

27. A device according to claim 15, wherein said load variation sensor is based on an integration method.

28. A device according to claim 15, further comprising a protection circuit that includes a comparator which has a further threshold value lower than said threshold value, the protection circuit being positioned between the reading circuit and the load variation sensor such that the load variation circuit is input said current trend from said reading circuit by way of the protection circuit.

29. A device according to claim 28, wherein said sensor, during a predetermined duration comprised between 0 and $4*\tau_L$ where $\tau_L = L/R_L$ and where L is an inductance of the LR circuit and $R_L$ is a resistance of the LR circuit, allows by way of said protection circuit to discriminate different variations of said load based on respective intensities or amplitudes and in relation to a status of said mismatch sensor.

30. A device according to claim 28, wherein said protection circuit includes a number of comparators that defines a precision degree of said load variation.

31. A device according to claim 15, wherein said threshold value of said sensor is set directly during a designing step and is comprised between $I_{MAX}/2$ and $I_{MAX}$, where $I_{MAX}$ indicates a highest current that the DC/DC converter phase can supply.

32. A device for regulating time constant matching of a DC/DC converter phase following a variation of a load applied to an output of said phase, said phase being associated with a coil network having an LR circuit connected in series and being connected to a reading network having an RC circuit connected in parallel to said coil network, the method comprising:
   acquiring means for acquiring a trend of a voltage detected across a capacitance of said RC circuit and for transforming the voltage trend into a current trend;
   detecting means for detecting a variation over a threshold value in the current trend obtained from said acquisition step;
   identification means, enabled by said detecting means, for determining a slope of said current trend; and
   regulation means for adapting a resistance value of said RC circuit according to said slope determined by said identification means.

33. The device of claim 32, wherein said identification means include means for determining said slope based on an integration of said current trend.

34. The device of claim 32, wherein said detection means has a duration comprised between 0 and $4*\tau_L$ where $\tau_L = L/R_L$ and where L is an inductance of the LR circuit and $R_L$ is a resistance of the LR circuit.

35. The device of claim 34, wherein said detection means during said duration allows to enable or disable said identification step based on overcoming a threshold value.

36. The device of claim 35, wherein said threshold value is a value comprised between $I_{MAX}/2$ and $I_{MAX}$, where $I_{MAX}$ indicates a highest current that the DC/DC converter phase can supply.

* * * * *